(12) United States Patent
Dobronsky et al.

(10) Patent No.: US 6,784,900 B1
(45) Date of Patent: Aug. 31, 2004

(54) METHOD FOR THE DYNAMIC IMPROVEMENT OF INTERNET BROWSER APPEARANCE AND CONNECTIVITY

(75) Inventors: Oren Dobronsky, Tel-Aviv (IL); Gabriella Karni, Tel-Aviv (IL)

(73) Assignee: Hotbar.com, Inc., New York, NY (US)

( * ) Notice: Subject to any disclaimer, the term of this patent is extended or adjusted under 35 U.S.C. 154(b) by 0 days.

(21) Appl. No.: 09/373,815

(22) Filed: Aug. 13, 1999

(30) Foreign Application Priority Data

Jul. 15, 1999 (IL) ................................................. 130972

(51) Int. Cl.$^7$ ................................................. G09G 5/00
(52) U.S. Cl. ...................... 345/744; 345/749; 345/760; 345/835; 345/840
(58) Field of Search ................................ 345/744–747, 345/779, 810, 835–840, 749, 733, 760, 725

(56) References Cited

U.S. PATENT DOCUMENTS

| | | | |
|---|---|---|---|
| 5,796,393 A | | 8/1998 | MacNaughton et al. |
| 5,923,885 A | | 7/1999 | Johnson et al. |
| 6,041,360 A | * | 3/2000 | Himmel et al. ................. 707/1 |
| 6,091,411 A | * | 7/2000 | Straub et al. ................ 345/703 |
| 6,133,915 A | * | 10/2000 | Arcuri et al. ................ 345/779 |
| 6,141,010 A | * | 10/2000 | Hoyle ......................... 345/854 |
| 6,232,972 B1 | * | 5/2001 | Arcuri et al. ................ 345/815 |
| 6,266,058 B1 | * | 7/2001 | Meyer ......................... 345/733 |
| 6,292,185 B1 | * | 9/2001 | Ko et al. ..................... 345/763 |
| 6,297,819 B1 | * | 10/2001 | Furst .......................... 345/733 |

FOREIGN PATENT DOCUMENTS

| | | |
|---|---|---|
| WO | WO 98/47080 | 10/1998 |
| WO | WO 00/25239 | 5/2000 |
| WO | WO 01/97121 A1 * | 12/2001 |
| WO | WO 02/32032 A2 * | 4/2002 |

OTHER PUBLICATIONS

Business Wire (Let Yahoo!Companion Be Your Guide; Users Can Now Customize Browser Toolbar to Feature Yahoo!Bookmarks and Services, pp. 1–2, Jun. 29, 1999).*
Stardock Press Release (Stardock Announces Window-Blinds, version 0.80, Mar. 24, 1999).*
Smith (WindowBlinds Preview 0.40).*
WindowBlinds 0.95 Updated (Stardock Systems, Jul. 12, 1999).*
Roberts, Scott; "The Browser Way If You Want It", MSDN Jan. 1999.
Esposito, D.: "Take Total Control Of Internet Explorer With Advanced Hosting Interfaces", Mind Oct. 1998.
"The Rebar Control: Using a Coolbar in Your Application", Nancy Winnick Cluts; Microsoft Corporation; Jun. 24, 1997.
"A Bookmarking Service for Organizing and Sharing URLs", Richard M. Keller et al.; Computer Networks & ISDN Systems; vol. 29, No. 8–13; Sep. 1, 1997.
NeoPlanet Inc. (htp://www.neoplanet.com).
Gulesian M.: "Plugging into the Web", DBMS (USA), Dec. 1996, vol. 9, Nr. 13, pp 69–70, 72, INSPEC Accesssion Nr. 5447715, ISSN 1041–5173.
Leebow's Friday Letter ( http://scout118.cs.wisc.edu/net–news/Jun. 4, 1999/0010.html).
Yahoo!Companion[http://www.32bit.com/software/listings/Internet/Plugin/_S/10416];Printed May 14, 2001.

* cited by examiner

*Primary Examiner*—Sy D. Luu
(74) *Attorney, Agent, or Firm*—Charles A. Rattner

(57) ABSTRACT

A method and system for providing the on-demand addition of graphic and other information to the browser's toolbar of a web surfer. A plug-in is installed or caused to be installed in the browser of the web surfer, and the information is allowed to be added to and/or modified in the toolbar area of the browser by the action of the plug-in. The information comprises a skin or a plurality of categorized or rated links, added to the links line of the toolbar. The skin may comprise a message, such as a greeting or an advertisement. The plug-in and the information may be provided to the surfer by a service web site.

26 Claims, 6 Drawing Sheets

METHOD FOR THE DYNAMIC IMPROVEMENT OF INTERNET BROWSER APPEARANCE AND CONNECTIVITY

FIELD OF THE INVENTION

The invention relates to a method for improving the appearance of Internet browsers, and their connectivity to web sites.

BACKGROUND OF THE INVENTION

The Internet is nowadays in common and widespread use, worldwide. Access to the Internet is gained using a so-called "browser", which is a program running on a PC (personal computer) that permits the user to connect to the Internet through a modem or a network. Generally speaking, Internet browsers are normally created using either the Active-X or the Java languages, although other languages can also be used. Representative examples of such browsers are the Microsoft Internet Explorer, which is an Active-X application, and the Netscape Navigator (or Communicator).

FIG. 1 illustrates a representative Internet Explorer page. The inactive part of the browser is the upper part, the so-called "toolbar", in which menus and function buttons are provided. This part also comprises a "Links" line, where specific links can be installed by the user. This part of the browser is not dynamic, and changes only in respect of the contents of the function buttons.

The browser window, on the other hand, is the part of the browser where dynamic information is shown when the user enters a specific web page.

In the example of FIG. 1, the home page of the well known Yahoo! Search engine is shown, with some of the options available to the user who accesses the Yahoo! Web site.

Attempts have been made in the art to functionalize the upper part of the browser, so as to permit it to be actively used for a variety of uses. This part has been left accessible by Microsoft on its explorer. The existing solutions, however, are complicated and cumbersome. For instance, NeoPlanet Inc. operates a site where a program can be downloaded to generate a new browser that, inter alia, has the ability to allow change of skin. This program, additionally, includes a list of useful links which are implanted in the browser when the NeoPlanet program is run. This program, however, presents the severe drawback that it is not an add-on to the Explorer, but rather a program that alters the Explorer altogether and, in fact, generates a new browser from it. Because of this fact, a large program (1.3 MB) has to be downloaded and run, and each skin that has to be installed is about 150–300 KB. Apart from the large program volume used, the great disadvantage is that the Microsoft Internet Explorer is not fully preserved, but rather a different browser is generated.

It is thus obvious that it is highly desired to provide a method by which the inactive portion of the browser can be utilized, without the need to generate a different browser.

It is therefore an object of this invention to provide a method and system which permit the owner of a browser to utilize the inactive portion of the browser.

It is another purpose of this invention is to provide a method and system that make it possible to change skins using a plug-in for a given browser.

It is a further object of the invention to provide a method and a system for dynamically supplying to a user-selected links, and to maintain them on a current basis.

Other purposes and advantages of this invention will become apparent as the description proceeds.

SUMMARY OF THE INVENTION

The present invention is mainly concerned with Active-X based browsers, although the invention can be used, mutatis mutandis, also in connection, e.g., with Java-based browsers or browsers based on any other language. Therefore, the invention is by no means limited to Active-X based browsers, and is meant to encompass also Java-based browsers. Throughout the description to follow reference will be made to Active-X based programs, and specifically to the Microsoft Internet Explorer, for the sake of brevity.

In one aspect, the invention is directed to a method for providing the on-demand addition of graphic and other information to the browser of a web surfer, comprising:
  providing a plug-in;
  installing or causing said plug-in to be installed in the browser of said web surfer; and
  allowing the information to be added to and/or modified in the toolbar area of said browser by the action of said plug-in.

According to a preferred embodiment of the invention the plug-in is in the form of an Active-X or the like element. However, plug-ins other than Active-X elements can of course be provided, as will be apparent to the skilled person.

According to a preferred embodiment of the invention the information comprises a skin. According to another preferred embodiment of the invention the information comprises a plurality of links, and said plurality of links are added to the links line of the toolbar. Furthermore, the links can be suitably categorized and/or rated. Throughout this specification whenever reference is made to "links" it should also be understood as including the "favorites" or the like part of the toolbar, and any other similar functional equivalent, all of which is included herein under the term "link", for the sake of brevity.

According to another preferred embodiment of the invention the skin comprises a message which may be, e.g., a greeting, or may comprise an advertisement.

Preferably, but non-limitatively, the plug-in and the information are provided to the surfer by a service web site. However, either or both of the plug-in and the information may be provided to the surfer by a web site which is not a service site. Such other web site would then function as a part of a service system. Thus, in another aspect the invention is directed to a system for providing the on-demand addition of graphic and other information to the browser's toolbar of a web surfer, comprising a service web site and one or more other sites each of which is authorized to provide to surfers the plug-in and/or information installable by said plug-in.

When the information is a skin and is provided to the surfer by a site other than a service site, the contents of the skin can be related to the site from which it is downloaded, or to any other pertinent subject.

The invention is further directed to a system for providing the on-demand addition of graphic and other information to the browser's toolbar of a web surfer, comprising:
  a service web site connected to the Internet;
  means provided in said web site to supply to a web surfer in desire of it a plug-in; and
  means for uploading to a browser in which said plug-in has been installed, or for permitting the user of said browser to download, information to be added to the toolbar area of said browser by the action of said plug-in.

As stated above, the system may further comprise one or more web sites other than a service site, said other web sites being equipped with means for providing the information to the surfer.

The invention also encompasses a service web site for providing the on-demand addition of graphic and other information to the browser's toolbar of a web surfer, comprising:

At least one connection to the Internet;

means for supplying to a web surfer in desire of it a plug-in; and means for uploading to a browser in which said plug-in has been installed, or for permitting the user of said browser to download, information to be added to the toolbar area of said browser by the action of said plug-in.

The invention is also directed to a plug-in for a browser, characterized in that it is provided with means suitable to replace the skin of the browser with an image provided to it.

The same or another plug-in for a browser can be provided with means suitable to add to the links line of the browser's toolbar links provided to it by a service web site.

BRIEF DESCRIPTION OF THE DRAWINGS

All the above and other characteristics and advantages of the invention will be better understood through the following illustrative and non-limitative description of preferred embodiments, with reference to the appended drawings, wherein.

DETAILED DESCRIPTION OF PREFERRED EMBODIMENTS

In the context of this application, "plug-in" means any program that can function in cooperation with a browser, and that can effect changes in the functions and/or appearance of the browser, without changing its main structure.

"Service web site" or "service site" is meant to indicate a web site having as one of its primary purposes that of supplying services to the users of the system of the invention. Particularly, the service site may supply plug-ins to new users, or may allow the download of skins or links by existing users.

Figure 1:
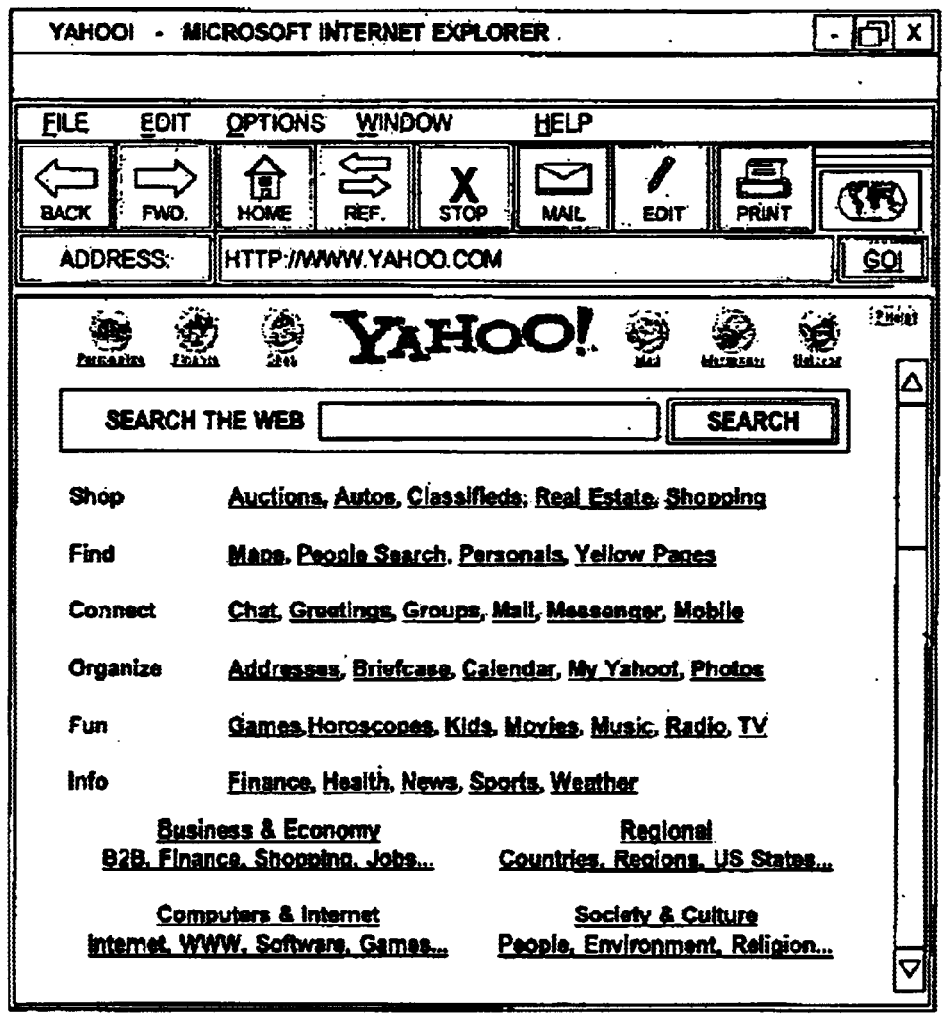
FIG. 1 shows a web page, as seen from a normal Microsoft Internet Explorer browser.
Figure 2:
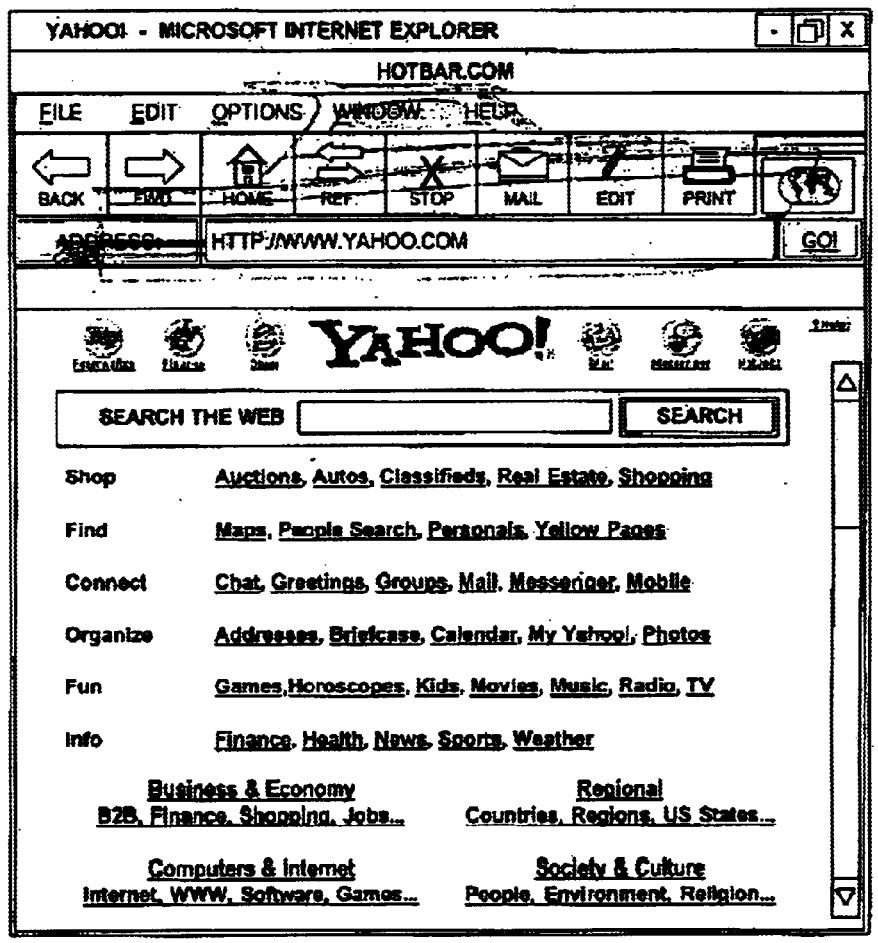
FIG. 2 shows a browser in which the skin of the toolbar has been changed, according to one preferred embodiment of the invention.

Looking now at FIG. 2, and comparing it to FIG. 1, it can be seen that the browser has changed its appearance in the toolbar area. This has been effected first by downloading and installing a plug-in that permits to effect changes in the toolbar zone, and then by downloading the desired skin, in the form of a graphic file. Graphic files containing skins are preferably—but not limitatively—downloaded in compressed format, to speed-up the process. Any suitable and known compression method and compressed files, such as ZIP or JPEG files, or modifications thereof, can be used, provided the plug-in is equipped with the relevant decompression utility.

The plug-in to be used in the system of the invention can be of any suitable type. According to a preferred embodiment of the invention the plug-in is created using Active-X architecture. According to a preferred embodiment of the invention the Active-X plug-in is downloaded from a web site, or otherwise supplied as a file, to the browser. In a preferred embodiment of the invention the plug-in is verified using the Verisign key or similar method. At the will of the user (by previous approval of this installation) the plug-in is installed in the browser. The plug-in now permits the user to carry out a variety of operations which can be effected using the Html/Javascript language. Installation of the plug-in can be effected by any suitable procedure, which is well known to the surfer, and therefore this procedure is not described herein in detail, for the sake of brevity.

EXAMPLE

Schematic Description of an ActiveX Plug-In Functionality

The ActiveX functionality, according to one particular preferred embodiment of the invention, is divided into 2 main parts:

1. Downloading a Desired Skin Image and Setting it as the Current Toolbar's Skin.

1. The html page gives a javascript command to the ActiveX Control (which is installed previously, upon entering the site) to download a specific Skin image.

2. The ActiveX control initiates an http connection with the desired skin image file. The file may be situated on any web site on the net and is in BMP format or in XIP format, or in any other suitable compressed or uncompressed format. (XIP format is a compressed format based on Z compression public library).

3. The file is downloaded and saved (after decompression) in BMP format.

4. Assigning values to the Registry Keys:

a. [HKEY_CURRENT_USER\Software\Microsoft\Internet\Explorer\Toolbar] "backbitmap" and [HKEY_CURRENT_USER\Software\Microsoft\Explorer\Toolbar] "backbitmapIE5" holds the path+name of the BMP file, as the Toolbar Background image of the Microsoft Internet Explorer Browser. (Additional Information is available at the Microsoft website).

b. [HKEY_CURRENT_USER\Software\Microsoft\Internet Explorer\Toolbar\WebBrowser] "ITBarLayout" holds the layout of the different elements on the Explorer's Toolbar. (if the Links line is closed, where exactly is located the Address line etc.) A Default value is assigned to this key in order to open the Links line, so that it will fit the Skin image.

5. After setting those values a refresh action should take place in order to refresh the current display. This is done by sending the active Explorer Window a double F11 command (The first F11 command makes the explorer window full screened, the second F11 retrieves it to the original status) and refreshes the Toolbar Skin Image. (In case the links line was closed, (paragraph 5.) before the new setting, a New browser window is opened (with the Links line opened) and the current window is closed).

2. Downloading Selected Links and Adding/Updating them in the Favorites/Links Line of the Toolbar's Browser.

1. The html page gives a javascript command to the ActiveX Control (which is installed previously, upon entering the site) to download a group of Links files.

Every file holds a list of links that should be present on the user's favorites/links folder.

Example (Hotbar Default links file, Enhanced Index of sport related links, Enhanced Index of sites located in France), this combination of files allow the user to personalize his dynamic content configuration.

2. The links files are download from the service Website after checking each one of them for the edited date. Only newer files than those already local are downloaded.

3. For faster download, The links files are downloaded compressed in the XIP format (based on Z compression public library) and decompressed by the ActiveX control.

4. The links files hold the following information:
a. A record for every icon file that should be downloaded.
b. A record for every Link Shortcut that should be created/present, containing data for:
The Folder and Name of the Link Shortcut, The URL it is pointing to, The Icon file.

5. The Group of files is united into one Links file. This file is processed and compared to the former Links file (the former links configuration). New link shortcuts are been added by generating a URL file in the proper folder.

Old Links (that do not appear in the New Links file) are deleted by deleting the proper URL file.

6. The icon files (.ICO, .DLL) are downloaded, if they are not already present.

Plug-ins generated according to the above are of relatively low volume, e.g., of the order of 80 KB.

Figure 3:
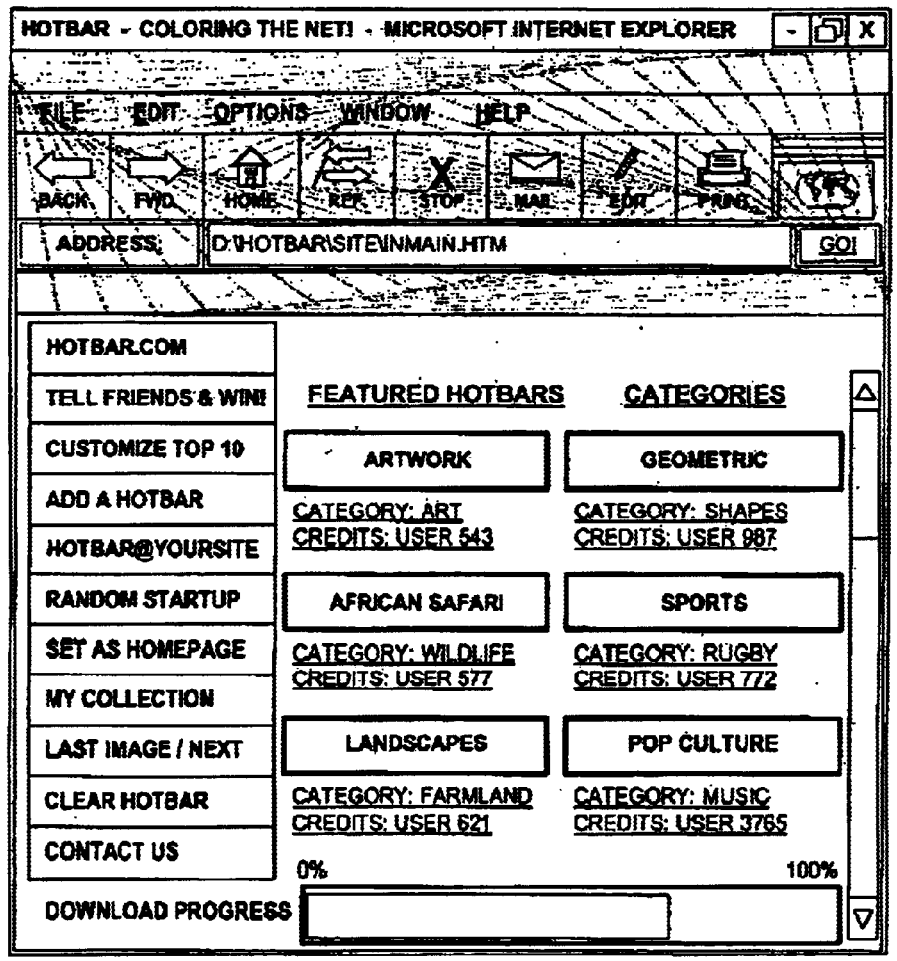
FIG. 3 shows an example of a page from a service web site, according to a preferred embodiment of the invention, from which the user can obtain the desired services.

FIG. 3 shows a page from a service site (called, in this example, "Hotbar"). The Hotbar site contains a large number of skins, classified, e.g., by category, and the skins are shown as samples in the web page. The user who has already installed the plug-in may choose a skin that suits him, and can download it by selecting it in any suitable way, e.g., by clicking it or a link related to it. This selection will eventually result in the installation of the skin in the toolbar area of the browser, as shown in FIG. 2.

Skins of this type are of very low volume and, in compressed form, are of a size of the order of 40–70 KB.

Figure 4:
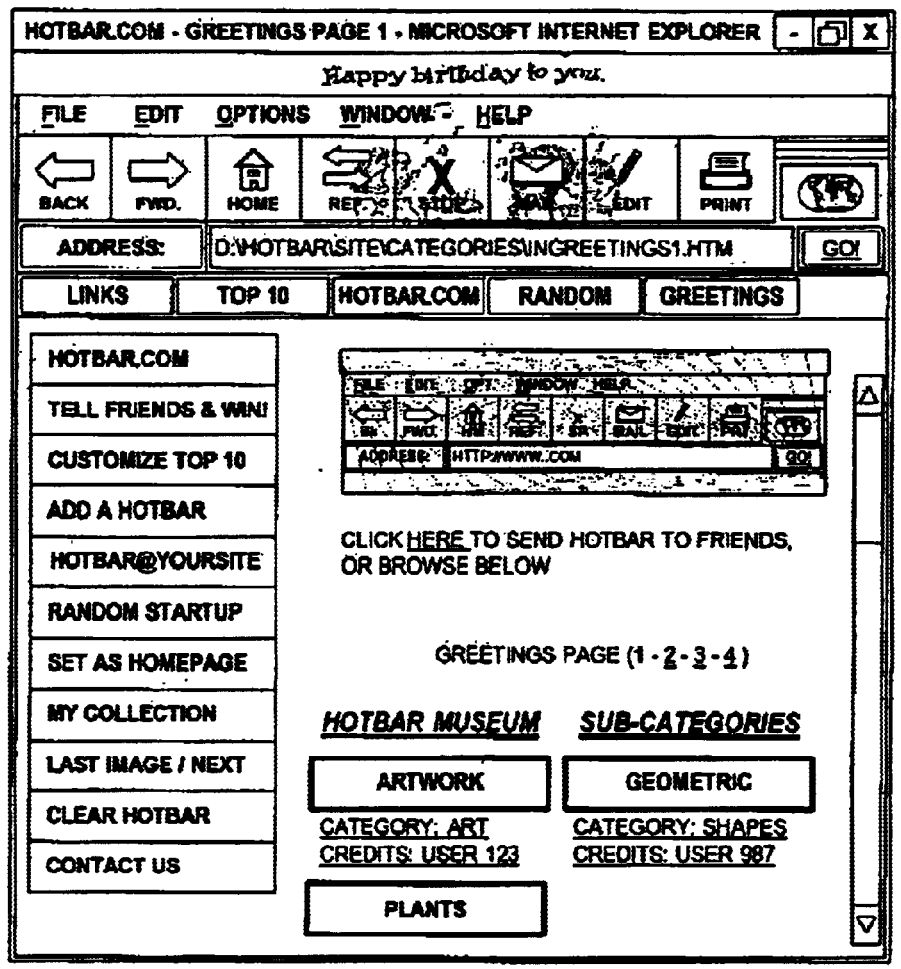
FIG. 4 is an example of another page of a service web site, including a greetings message, according to a preferred embodiment of the invention.

Another important embodiment of the invention is illustrated in FIG. 4. According to this preferred embodiment of the invention a skin can be downloaded not for personal use in the browser, but rather for delivery as a message to a third party. Thus, according to the example of FIG. 4, messages such as a greeting can be selected and attached to a message sent to a third party, whether directly from the Hotbar (service) web site, or as an e-mail message containing a link to a service site. The recipient then installs the skin in his browser's toolbar and receives the greeting simultaneously. The plug-in must be installed, if it was not previously installed, before the skin can be installed.

Figure 5:
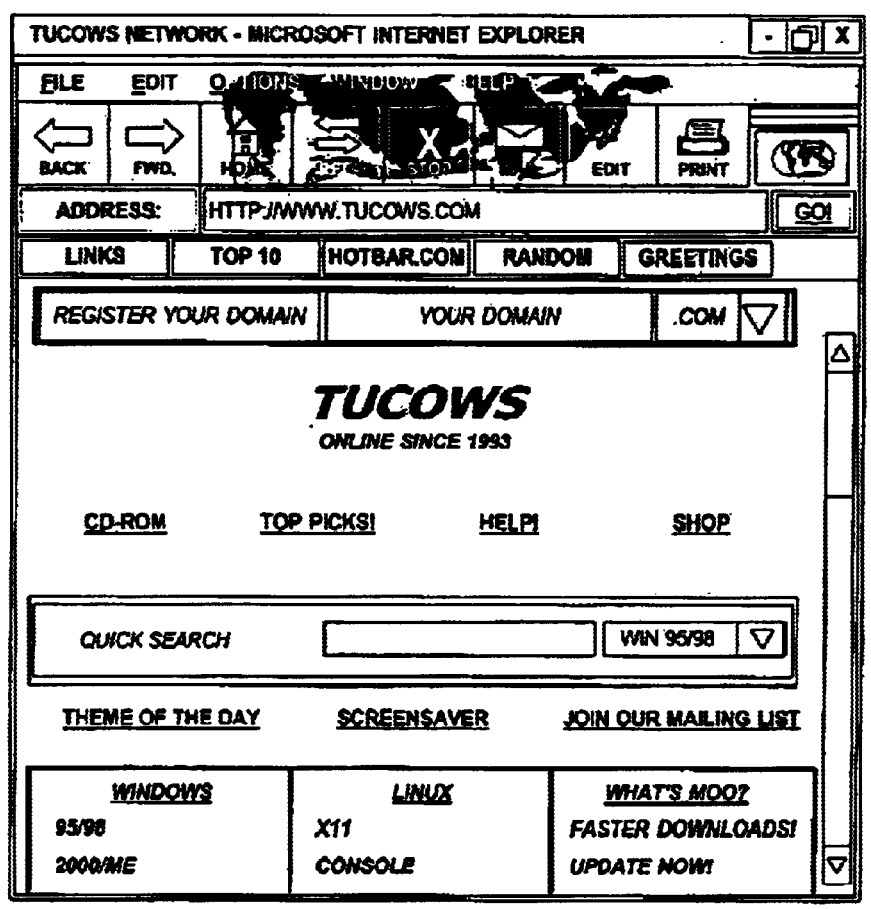
FIG. 5 shows the result of another preferred embodiment of the invention, where the toolbar skin is provided to the user not by a service web site, but rather by a regular web site, and contains advertising contents.
Figure 6:
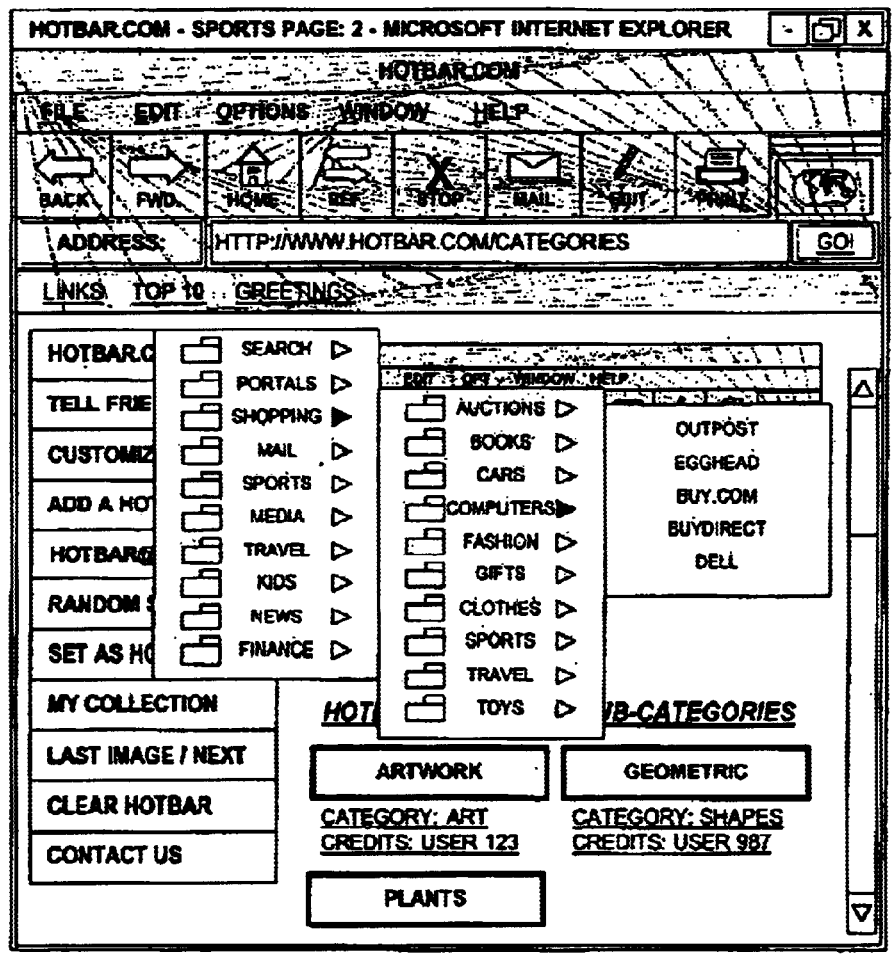
FIG. 6 illustrates a selection of links available from a service web site for uploading by the user, according to a further preferred embodiment of the invention.

According to a further preferred embodiment of the invention, a suitable skin is provided to a site that may permit to download it to any browser provided with a plug-in of the invention. This is illustrated in FIG. 5, that shows the home page of the well-known TUCOWS web site. The skin added to the browser's toolbar maintains the TUCOWS motif. Thus, a site such as TUCOWS may be licensed to offer the download of a matching skin (and perhaps also of the plug-in) from its site. This, as will be easily apparent, is a powerful advertisement vehicle, since the skin remains in the browser's toolbar also after leaving the site, for as long as the user does not decide to replace it with another skin.

According to yet another preferred embodiment of the invention, the plug-in also permits to upload to the browser's toolbar, e.g., in the links line, selected links to be used by the user at his convenience. The user may select to upload selected categories, or may upload a package of categorized links, for later consideration. Thus, it is possible to offer to the user links that have been previously categorized and rated, possibly along with promotional links identified as commercial advertisements. Uploading of the link information can, of course, be effected only when the user connects to a service site.

As will be apparent to the skilled person, the inventions solves the problem of effectively and usefully using the toolbar area of the browser for the aesthetic pleasure of the user, for promotional and advertisement purposes, and for any other purpose. It further permits to supply information of general and commercial interest, in the form of preselected links to be added to the toolbar, which is a convenient and useful service for many surfers who do not have the time to categorize and rate web sites of interest. The invention thus provides in a very convenient way services which to date were not provided, or were provided in a cumbersome and inconvenient manner.

While embodiments of the invention have been described by way of illustration, it will be understood that the invention can be carried out by persons skilled in the art with many modifications, variations and adaptations, without departing from its spirit or exceeding the scope of the claims.

What is claimed is:

1. A method for providing graphic and other information to a browser's toolbar area of a web surfer, comprising:
providing a plug-in;
transmitting said plug-in to be installed in the browser of said web surfer, said graphic and other information displayed as a skin in the toolbar area of said browser by the operation of a module of said plug-in; and
allowing said graphic and other information to be dynamically updated according to further information obtained from a web site that is being accessed by said web surfer.

2. A method according to claim 1, wherein the graphic and other information comprises the skin.

3. A method according to claim 2, wherein the skin comprises a message.

4. A method according to claim 3, wherein the message is a greeting.

5. A method according to claim 3, wherein the message is an advertisement.

6. A method according to claim 1, wherein the graphic and other information comprises a plurality of links added to a links line of the toolbar area.

7. A method according to claim 6, wherein the links are categorized.

8. A method according to claim 6, wherein the links are rated.

9. A method according to claim 1, wherein the plug-in and the graphic and other information is provided to the surfer by a service web site.

10. A method according to claim 1, wherein the graphic and other information is provided to the surfer by a specific web site other than a web site from which the plug-in is received, and wherein said graphic and other information is related to the specific web site from which it is being downloaded.

11. A method according to claim 10, wherein the skin corresponds to the site from which it is downloaded.

12. A method according to claim 1, wherein the plug-in comprises an Active-X element.

13. A system for providing on-demand addition of graphic and other information to a browser having a toolbar on a graphical user interface of a web surfer, comprising:

a service web site connected to a network;

means provided by said service web site to transmit a plug-in to a web surfer via the network, and means for uploading a skin to a toolbar area of the browser in which said plug-in has been installed, graphic information corresponding to a second web site being accessed by said browser, by operation of a module of said plug-in.

14. A system according to claim 13, wherein the graphic information comprises a plurality of skins.

15. A system according to claim 14, wherein the skins comprise a message.

16. A system according to claim 15, wherein the message is a greeting.

17. A system according to claim 15, wherein the message is an advertisement.

18. A system according to claim 14, wherein the plug-in and the graphic information is provided to the surfer by the service web site.

19. A system according to claim 14, further comprising a web site other than the service site, said other web site being equipped with means for providing the graphic information to the surfer, wherein said graphic information is related to the other web site from which it is being downloaded.

20. A system according to claim 19, wherein the graphic information is related to the other web site from which it is downloaded.

21. A system according to claim 14, wherein the plug-in comprises an Active-X element.

22. A system according to claim 13, wherein the graphic information comprises a plurality of links added to a links line of the toolbar.

23. A system according to claim 22, wherein the links are categorized.

24. A system according to claim 22, wherein the links are rated.

25. A service web site for providing on-demand addition of graphic and other information to a browser having a toolbar on a graphical user interface of a web surfer, comprising:

at least one connection to the Internet;

means for supplying a plug-in to a web surfer via the Internet upon request; and means for dynamically uploading, to a toolbar area of a browser of the web surfer in which said plug-in has been installed, graphic information for display as a skin in the toolbar area of said browser by the action of a module of said plug-in, the graphic information corresponding to another web site being accessed by the web surfer.

26. A system for providing on-demand addition of graphic and other information to a toolbar area in a graphical user interface of a browser of a web surfer, the system comprising a service web site and one or more other web sites each of which authorized to provide to surfers a plug-in and other information installable by said plug-in, the plug-in for providing graphic information as a skin in the toolbar area, the graphic information corresponding a web site being accessed by the web surfer.

\* \* \* \* \*